US012607482B2

(12) United States Patent
Christen

(10) Patent No.: US 12,607,482 B2
(45) Date of Patent: Apr. 21, 2026

(54) CENTRAL MULTI-USER INHOME DISPLAY DEVICE FOR WATER METERS

(71) Applicant: GWF AG, Lucerne (CH)

(72) Inventor: Stefan Christen, Huenenberg (CH)

(73) Assignee: GFW AG, Lucerne (CH)

( * ) Notice: Subject to any disclaimer, the term of this patent is extended or adjusted under 35 U.S.C. 154(b) by 0 days.

(21) Appl. No.: 18/798,402

(22) Filed: Aug. 8, 2024

(65) Prior Publication Data

US 2026/0043674 A1 Feb. 12, 2026

(51) Int. Cl.
*G01D 4/00* (2006.01)
*G01F 15/061* (2022.01)

(52) U.S. Cl.
CPC ........... *G01D 4/004* (2013.01); *G01F 15/061* (2013.01); *G01D 2204/18* (2021.05)

(58) Field of Classification Search
CPC ... G01D 4/004; G01D 2204/18; G01F 15/061
See application file for complete search history.

(56) References Cited

U.S. PATENT DOCUMENTS

| | | | |
|---|---|---|---|
| 9,410,821 B1 | 8/2016 | Marquross | |
| 10,354,126 B1 * | 7/2019 | Nagalla | G06Q 20/40145 |
| 11,183,044 B1 * | 11/2021 | Klein | G08B 25/016 |
| 2007/0124253 A1 * | 5/2007 | Angerame | G06Q 50/06 |
| | | | 705/63 |
| 2013/0144769 A1 * | 6/2013 | Swaminathan | G08C 15/06 |
| | | | 340/870.03 |
| 2016/0076909 A1 * | 3/2016 | Klicpera | G01F 15/0755 |
| | | | 73/198 |
| 2017/0163564 A1 * | 6/2017 | Pogrebinsky | G06F 9/5072 |
| 2020/0110531 A1 * | 4/2020 | Sarang | G06F 3/0483 |
| 2021/0400767 A1 * | 12/2021 | Zubiaur | H04W 88/16 |
| 2022/0212952 A1 * | 7/2022 | Veloo | G06Q 50/06 |

FOREIGN PATENT DOCUMENTS

WO    WO-2018027292 A1 *    2/2018    ............. G01F 15/18

* cited by examiner

*Primary Examiner* — Amine Benlagsir
(74) *Attorney, Agent, or Firm* — Workman Nydegger

(57) ABSTRACT

An inhome display device and method are provided for reading and monitoring consumed hot and cold water that includes a plurality of water meters which measure hot and cold water consumption and encrypt the consumption data, one internal or external radio module per water meter for transmitting the encrypted consumption data, a gateway for one or multiple water meters for receiving and transmitting the encrypted consumption data to a remote backend server. The consumption data is decrypted, processed and made available in the remote backend server. The consumption data of a water meter is retrievable from the remote backend server via at least one central inhome display and displayed on the at least one central inhome display.

15 Claims, 2 Drawing Sheets

CENTRAL MULTI-USER INHOME DISPLAY DEVICE FOR WATER METERS

TECHNICAL FIELD

The invention relates to inhome display devices for monitoring hot and cold water consumption in rented apartments to provide a way for tenants to verify water bills and water consumption.

BACKGROUND OF THE INVENTION

In California, it is required by law that tenants can visually read their water meters (cold and hot water meters) to verify the amount of water billed and consumed. However, many of the water meters are installed in walls and ceilings and therefore cannot be read visually by the tenant.

Established companies install a radio module with an integrated display for each water meter, which allows the meter to be read visually in accordance with the law.

The disadvantage of the existing solutions is that it is very cost-intensive, as a building complex can have more than 800 water meters, each of which not only requires a radio module, but also a display for visual reading. Such a solution is known, for example, from U.S. Pat. No. 9,410,821 B1. In addition, usage fees must be paid for all displays.

It is therefore the object of the invention to avoid or at least mitigate the disadvantages of the prior art. In particular, it should still be possible for tenants to monitor their hot and cold water consumption in an easily accessible way, but the number of water meter displays should be drastically reduced to provide a more cost-effective and sustainable solution for both tenants and landlords.

The objective is being achieved by the present invention, by having an inhome display device for reading and monitoring consumed hot and cold water with a plurality of water meters which measure hot and cold water consumption and encrypt the consumption data, one internal or external radio module per water meter for transmitting the encrypted consumption data, a gateway for one or multiple water meter for receiving and transmitting the encrypted consumption data to a remote backend server, wherein the consumption data is decrypted, processed and made available in the remote backend server, and wherein the consumption data of a water meter is retrievable from the remote backend server via at least one central inhome display and displayed on the at least one central inhome display.

The great advantage of the aforementioned solution is that a large number of water meters can be monitored and read by a single display. By placing such a central display in a generally accessible location, all tenants can read their water meters individually without the need for a large number of displays for each water meter.

Furthermore, the objective is being achieved by the present invention by providing a method for the inhome display device for reading and monitoring consumed hot and cold water wherein the consumption data is only retrievable and is only displayed on the single central inhome display by a correct user identification, which depends on the settings stored on the backend server and takes place by either typing in a serial number of a specific water meter or a user name and corresponding password on the central inhome display and by comparing and verifying the user input with the data stored on the backend server.

The method offers the enormous advantage that the consumption data of the respective water meters can be retrieved at a generally accessible location, but cannot be viewed by everyone, but only the tenants can retrieve their corresponding water consumption data.

Advantageous embodiments are claimed in the dependent claims and are explained in more detail below.

It is advantageous if the remote backend server comprises a gateway administrator software for managing, configuring and monitoring the water meters via the gateways.

This has the advantage that the water meters can be monitored, controlled and updated centrally.

It is useful if the remote backend server is communicating with the respective gateways via a wired local area network (LAN) connection or a wireless local area network (WLAN) connection or a wide area network (WAN) connection.

It is a great advantage that the backend server can be used for different communication connections, as each type of communication—LAN, WLAN and WAN—has advantages and disadvantages that make it more or less suitable for different applications, so that the most suitable type of communication can be selected thanks to the versatile compatibility of the backend server.

An advantageous embodiment is characterized in that each hot and cold water meter is installed in different apartments in a building complex and the at least one central inhome display is located at a commonly accessible location in the building complex. It shall be noted that each apartment has one cold or one cold and one hot water meter.

This has the advantage that the clear assignment of a water meter to an individual apartment means that the consumption of an individual tenant can be precisely queried, which would not be the case if, for example, a water meter were to monitor the water consumption of several rented apartments. In addition, the privacy of the tenants is protected as each tenant can query their own consumption data.

It is also preferable if each water meter is stored as assigned to the building complex in the backend server and wherein the at least one central inhome display is stored as assigned to the building complex so that only consumption data for the water meters in the building complex are retrievable on the at least one inhome display.

This has the advantage that a clear separation of data is possible and only consumption data from water meters located in the building complex in which the inhome display is installed can be queried by an inhome display.

According to an advantageous further embodiment a plurality of building complexes can be stored in the backend server and each building complex can have its own water meters, which are assigned to the respective building complex in a 1:1 relationship and wherein each building complex can have at least one central inhome display, which is assigned to the respective building complex in a 1:1 relationship, so that only information about water meters of the building complex in which the respective inhome display is located can only be retrieved from this specific inhome display.

This has the advantage that a large number of water meters and inhome displays can be managed via a remote backend server, but clear data separation is still possible, wherein only the consumption data of the water meters located in the same first building complex as the querying inhome display can be queried and wherein another second inhome display located in a second building complex cannot query the consumption data of the water meters of the first building complex.

In a preferred embodiment the central inhome display can be a touchpad for executing query instructions and for authentication and authorization.

It is also useful if the central inhome display comprises a fingerprint scanner and/or facial recognition camera and/or an iris recognition camera for authentication and authorization.

This has the advantage that a variety of identification options can be provided for tenants.

A corresponding method for an inhome display device with a fingerprint scanner and/or a facial recognition camera and/or an iris recognition camera, provides that the consumption data can only be retrieved and displayed on the single central Inhome display if a correct user identification is made, which depends on the settings stored on the backend server and is achieved by capturing biometric characteristics of a user, such as fingerprints with a fingerprint scanner connected to the Inhome display or facial recognition by an iris recognition camera connected to the Inhome display. e.g. fingerprints with a fingerprint scanner connected to the inhome display or facial recognition by a facial recognition camera connected to the inhome display or iris scans by an iris recognition camera, and the comparison and verification of the biometric features with the data stored on the backend server.

In other words, the invention relates to an inhome display device in which all displays in the wireless modules are complemented with a single central display in the lobby of a building complex which is accessible to all tenants. It should be noted that for legal reasons there are no water meters on the markets without display. This common display simply acts as a display for a multitude of meters.

The meters (cold and hot water) in the apartments transmit the current meter reading to the gateways. The gateways send the data to the gateway administrator software in the backend system.

The encrypted raw data is decrypted, processed and made available in the inhome display.

Tenants can query their meter reading at the inhome display at any time. The inhome display queries the data interface on the backend system with an API call and receives the meter reading from the meter in response and can validate the bill.

Furthermore, depending on the setting, the user/tenant can be identified with the serial number of the water meter or with the apartment number or a password.

An assignment "Meter to building" and assignment "Building to inhome display" ensures that only meters in the same building complex can be called up on the inhome display.

All meters and all buildings are saved in the backend system and assigned to each other with a 1:1 relationship. The inhome display is also assigned to a specific building complex with a 1:1 relationship. This ensures that no meters outside the building complex can be read on the inhome display.

BRIEF DESCRIPTION OF THE DRAWINGS

The invention is explained below with the aid of the following drawings.

DETAILED DESCRIPTION

Figure 1:
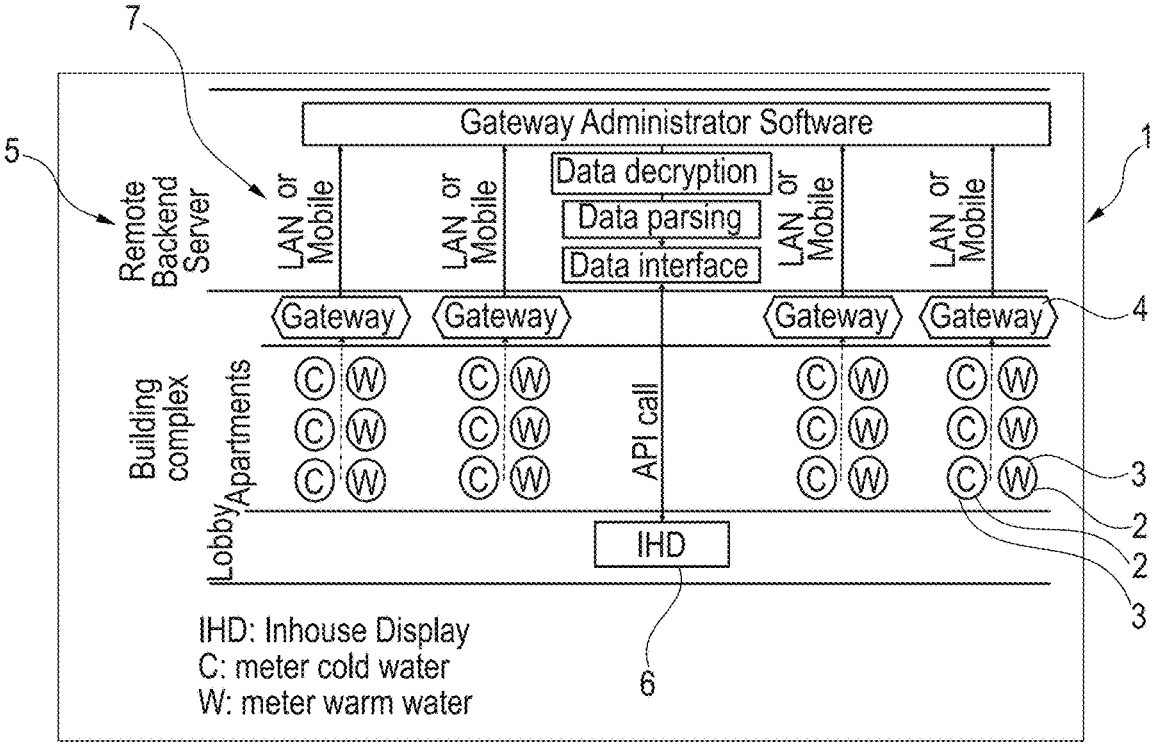
FIG. 1 is a block diagram of the features of an inhome display device and its environment.

FIG. 1 shows a first embodiment of an inhome display device 1 for reading and monitoring consumed hot and cold water with a plurality of water meters 2 which measure hot and cold water consumption and encrypt the consumption data. Furthermore, the inhome display device comprises one radio module 3 per water meter 2 for transmitting the encrypted consumption data and a gateway 4 per water meter 2 for receiving and transmitting the encrypted consumption data to a remote backend server 5, wherein the consumption data is decrypted, processed and made available in the remote backend server 5 and wherein the consumption data of a water meter 2 is retrievable from the remote backend server 5 via at least one central inhome display 6 and displayed on the at least one central inhome display 6.

The remote backend server 5 of an inhome display device 1 comprises a gateway administrator software which makes it possible to manage, configure and monitor the water meters 2 via the gateways 4.

A connection and communication between the remote backend server 5 and the gateways 4 is implemented either via wired local area network (LAN) connection 7, a wireless local area network (WLAN) connection 7 or wide area network (WAN) connection 7.

A LAN connection 7 is preferably used if devices, i.e. the water meters 2 and the remote backend server 5, are to be connected and are physically close to each other, allowing comparatively secure communication to take place with low susceptibility to interference.

A WLAN connection 7 is preferable in order to dispense with cables for data transmission, which significantly increases the flexibility of use, although WLAN connections are generally more susceptible to interference than LAN connections and offer lower data transmission rates.

A WAN connection 7 can cover large buildings, a campus or a residential area to connect multiple locations that extend over a specific geographic area or even the world. WANs are often used to exchange data between companies, employees and customers in different regions or countries.

Furthermore, the inhome display device 1 is configured such that each hot and cold water meter 2 is installed in a different apartment in a building and the at least one central inhome display 6 is located at a commonly accessible location in the building meaning that every tenant can conveniently read their water consumption without the need for a meter reading display for each apartment.

Figure 2:
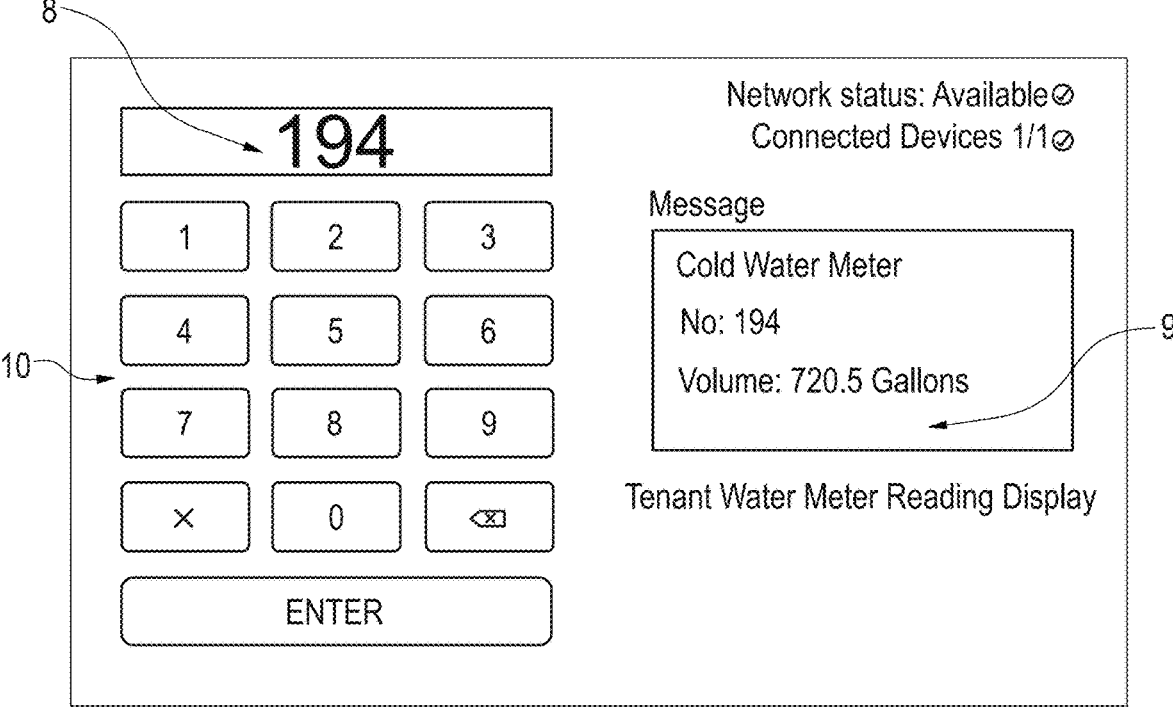
FIG. 2 is an illustration of a display of a first embodiment of an inhome display device which is displaying a number pad and a cold water consumption.

Said aforementioned display 6 can be seen in FIG. 2 and displays not just the consumption data of one of the cold water meters 2 but also comprises a first section 8 for displaying the apartment number on the display 6.

Moreover, optionally the display 6 has a second section 9 where it displays the time of the water consumption measurement.

Moreover, as can be seen both in FIG. 2 the central inhome display has a third section 10 for displaying a number pad with touchpad function for executing query instructions and for authentication and authorization by for example typing in the apartment number first and then typing in the corresponding pin in order to get access to consumption data of the respective apartment.

Another feature of the inhome display device 1 is that each water meter 2 is stored in the backend server 5 assigned to the building complex in which it is installed, and that the central inhome display 6 is stored assigned to the building complex in which it is installed, so that only the consumption data of the water meters 2 in the building complex in which the inhome display 6 is installed can be retrieved Furthermore, the remote backend server 5 of an inhome display device 1 is able to manage, configure and monitor the water meters 2 and inhome displays 6 of a multitude of building complexes and is implemented by storing each building complex with its water meters 2 in the remote backend server 5, wherein the water meters 2 are assigned to the respective building complex in a 1:1 relationship and wherein each building complex has at least one central inhome display 6, which is assigned to the respective building complex in a 1:1 relationship, so that only information about water meters 2 of the building complex in which the respective inhome display 6 is located can only be retrieved from this specific inhome display 6.

A 1:1 relationship here means a link between information in two tables, whereby each data record only occurs once in each table. In practice, this means that a data record from the first table is linked to at most one data record from the second table. This type of link is used to manage special access authorizations or to manage data in an object-oriented manner.

Figure 3:
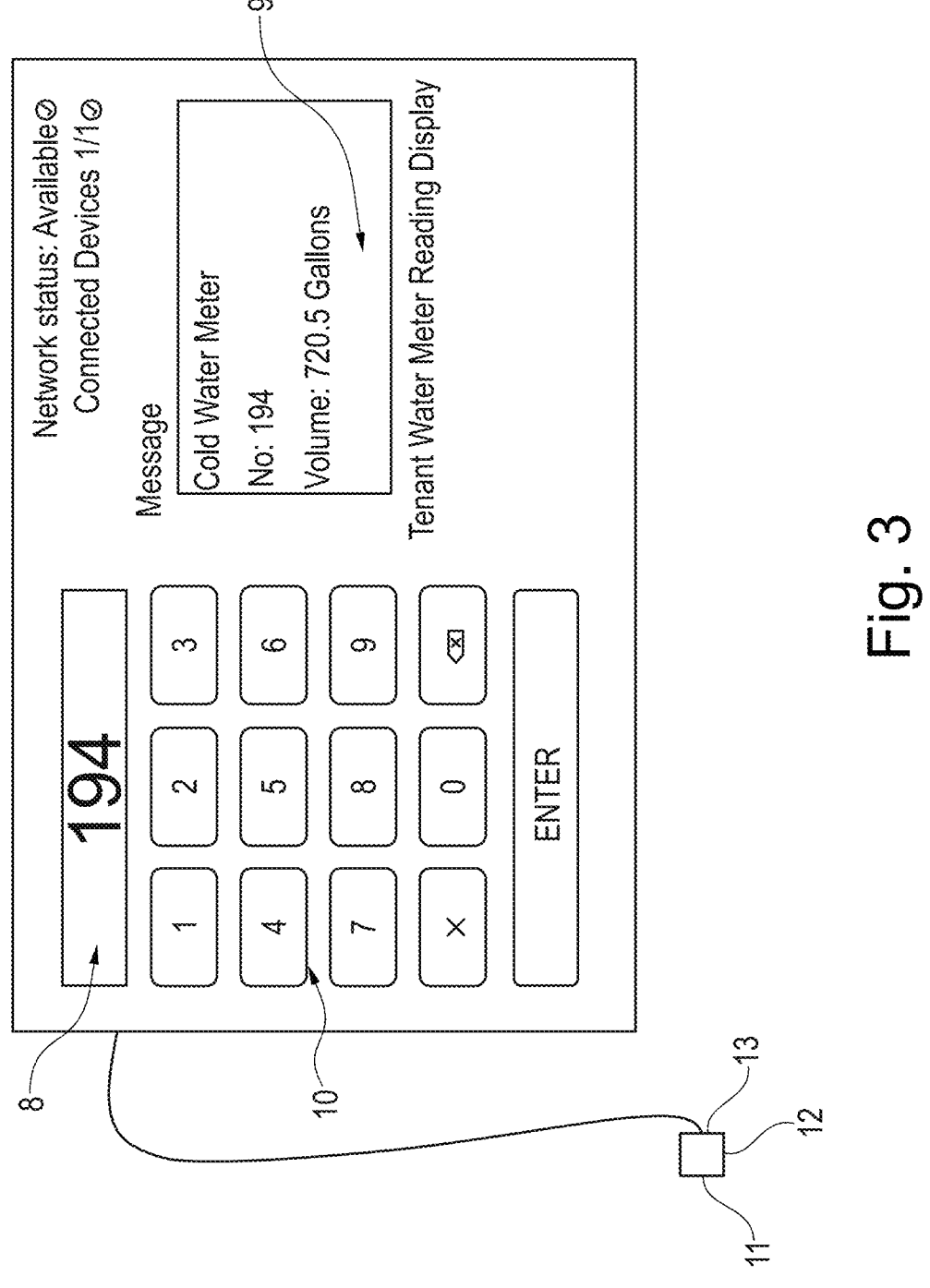
FIG. 3 is an illustration of a second embodiment of an inhome display device with an inhome display connected to a fingerprint scanner and/or facial recognition camera and/or an iris recognition camera for authentication and authorization

In a second embodiment of the inhome display device 1 which can be seen in FIG. 3 the display 6 is connected to either a fingerprint scanner 11 and/or facial recognition 12 camera and/or an iris recognition camera 13 for authentication and authorization.

In order for a user to be able to query his or her water consumption in the first embodiment of an inhome display device 1, the user must carry out correct user identification on the inhome display 6 by either typing in a serial number of a specific water meter 2 or a user name and corresponding password on the central inhome display 6 and whereby the entered data is compared with data stored in the remote backend server 5 and verified.

Another type of user identification is possible via the second embodiment of the inhome display device 1 shown in FIG. 3 by querying, comparing and verifying biometric data stored on the remote backend server 5. Such biometric data can be fingerprints, which are scanned by a finger scanner 11, or facial features, which are scanned by a face scanner 12, or iris features, which are scanned by an iris recognition camera 13.

The invention claimed is:

1. An inhome display system for reading and monitoring water consumption, the inhome display system comprising:
   a plurality of water meters, each of the water meters being configured to measure hot water consumption and/or cold water consumption to obtain consumption data and encrypt the consumption data to output the encrypted consumption data,
   at least one transmitter per each water meter that transmits the encrypted consumption data,
   a plurality of gateways, each of the plurality of gateways corresponding to a respective one of the plurality of water meters such that at least one gateway is provided per each water meter of the plurality of water meters, each of the gateways being configured to receive and transmit the encrypted consumption data to a remote backend server, wherein the encrypted consumption data is decrypted, processed and made available in the remote backend server,
   wherein the consumption data of at least one of the plurality of water meters is retrievable from the remote backend server via at least one central inhome display and displayed on the at least one central inhome display,
   wherein each of the plurality of water meters is installed in a different apartment in a building complex and the at least one central inhome display is located at a commonly accessible location in the building complex,
   wherein the at least one central inhome display is a touchpad for executing query instructions and for authentication and authorization, and
   wherein a plurality of assigned building complexes are stored in the backend server and each assigned building complex has its own assigned water meters, which are assigned to the respective assigned building complex in a 1:1 relationship and wherein each assigned building complex has at least one assigned central inhome display, which is assigned to the respective assigned building complex in a 1:1 relationship, so that only information about the assigned water meters of the assigned building complex in which the at least one assigned inhome display is located can only be retrieved from the at least one assigned central inhome display.

2. The inhome display system according to claim 1, wherein the remote backend server comprises a gateway administrator software for managing, configuring and monitoring the water meters via the gateways.

3. The inhome display system according to claim 2, wherein each of the gateways is configured to communicate with the remote backend server is via a wired local area network connection or a wireless local area network connection or a wide area network connection.

4. The inhome display system according to claim 1, wherein in addition to the consumption data of said each of the water meters, an apartment number is displayed in the at least one central inhome display.

5. The inhome display system according to claim 1, wherein each of the plurality of water meters is stored as assigned to the building complex in the backend server and wherein the at least one central inhome display is stored as assigned to the building complex so that only the consumption data for said each of the water meters in the building complex are retrievable on the at least one inhome display.

6. The inhome display system according to claim 1, wherein the at least one central inhome display comprises a biometric scanner for the authentication and the authorization.

7. The inhome display system according to claim 1, wherein the at least one transmitter is a radio transmitter.

8. The inhome display system according to claim 1, wherein the plurality of water meters includes a first water meter that measures the hot water consumption of a first water line and a second water meter that measures the cold water consumption of a second water line.

9. The inhome display system according to claim 8, wherein the first water line and the second water line each pertain to a first tenant.

10. The inhome display system according to claim 9, wherein the plurality of water meters includes a third water meter that measures the hot water consumption of a third water line and a fourth water meter that measures the cold water consumption of a fourth water line, wherein the third water line and the fourth water line each pertain to a second tenant, the second tenant being different than the first tenant.

11. A method for reading and monitoring water consumption, the method comprising:

providing an inhome display system, wherein the inhome display system comprising:

a plurality of water meters, each of the water meters being configured to measure hot water consumption and/or cold water consumption to obtain consumption data and encrypt the consumption data to output the encrypted consumption data, at least one transmitter per each water meter that transmits the encrypted consumption data, and a plurality of gateways, each of the plurality of gateways corresponding to a respective one of the plurality of water meters such that at least one gateway is provided per each water meter of the plurality of water meters, each of the gateways being configured to receive and transmit the encrypted consumption data to a remote backend server, wherein the encrypted consumption data is decrypted, processed and made available in the remote backend server, wherein the consumption data of at least one of the plurality of water meters is retrievable from the remote backend server via at least one central inhome display and displayed on the at least one central inhome display, wherein each of the plurality of water meters is installed in a different apartment in a building complex and the at least one central inhome display is located at a commonly accessible location in the building complex, and wherein the at least one central inhome display is a touchpad for executing query instructions and for authentication and authorization, wherein the consumption data is only retrievable and is only displayed on the at least one central inhome display by confirming a correct user identification, wherein said confirming the correct user identification includes:

storing settings on the backend server, and identifying the correct user identification by receiving user input by either receiving a serial number of a specific water meter or a user name and a corresponding password on the at least one central inhome display and by comparing and verifying the user input with the settings stored on the backend server, and wherein a plurality of assigned building complexes are stored in the backend server and each assigned building complex has its own assigned water meters, which are assigned to the respective assigned building complex in a 1:1 relationship and wherein each assigned building complex has at least one assigned central inhome display, which is assigned to the respective assigned building complex in a 1:1 relationship, so that only information about the assigned water meters of the assigned building complex in which the at least one assigned inhome display is located can only be retrieved from the at least one assigned central inhome display.

12. A method for reading and monitoring water consumption, the method comprising:

providing an inhome display system, wherein the inhome display system comprising:

a plurality of water meters, each of the water meters being configured to measure hot water consumption and/or cold water consumption to obtain consumption data and encrypt the consumption data to output the encrypted consumption data, at least one transmitter per each water meter that transmits the encrypted consumption data, and a plurality of gateways, each of the plurality of gateways corresponding to a respective one of the plurality of water meters such that at least one gateway is provided per each water meter of the plurality of water meters, each of the gateways being configured to receive and transmit the encrypted consumption data to a remote backend server, wherein the encrypted consumption data is decrypted, processed and made available in the remote backend server, wherein the consumption data of at least one of the plurality of water meters is retrievable from the remote backend server via at least one central inhome display and displayed on the at least one central inhome display, wherein each of the plurality of water meters is installed in a different apartment in a building complex and the at least one central inhome display is located at a commonly accessible location in the building complex, and wherein the at least one central inhome display is a touchpad for executing query instructions and for authentication and authorization, wherein the consumption data is only retrievable and is only displayed on the at least one central inhome display by a confirming correct user identification, and wherein said confirming the correct user identification includes:

storing settings on the backend server, capturing one or more biometric characteristics of a user, and comparing and verifying the one or more biometric characteristics with the settings stored on the backend server, and wherein the at least one central inhome display comprises a biometric scanner for the authentication and the authorization, and wherein a plurality of assigned building complexes are stored in the backend server and each assigned building complex has its own assigned water meters, which are assigned to the respective assigned building complex in a 1:1 relationship and wherein each assigned building complex has at least one assigned central inhome display, which is assigned to the respective assigned building complex in a 1:1 relationship, so that only information about the assigned water meters of the assigned building complex in which the at least one assigned inhome display is located can only be retrieved from the at least one assigned central inhome display.

13. The method according to claim 12, wherein the one or more biometric characteristics includes a fingerprint and the one or more biometric characteristics are captured with a fingerprint scanner connected to the at least one central inhome display.

14. The method according to claim 12, wherein the one or more biometric characteristics includes a facial recognition and the one or more biometric characteristics are is captured by facial recognition camera connected to the at least one central inhome display.

15. The method according to claim 12, wherein the one or more biometric characteristics includes an iris scan and the one or more biometric characteristics are captured by an iris recognition camera connected to the at least one central inhome display.

* * * * *